(12) United States Patent
Han et al.

(10) Patent No.: US 7,591,343 B2
(45) Date of Patent: Sep. 22, 2009

(54) APPARATUSES FOR GENERATING ACOUSTIC WAVES

(75) Inventors: Wei Han, Missouri City, TX (US);
Robert Birchak, Spring, TX (US);
William Trainor, Houston, TX (US);
Thomas Ritter, Katy, TX (US); Kwang Yoo, Houston, TX (US); Diederik Van Batenburg, Delft (NL); Dan Kusmer, Stafford, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 251 days.

(21) Appl. No.: 11/213,653

(22) Filed: Aug. 26, 2005

(65) Prior Publication Data

US 2007/0045038 A1    Mar. 1, 2007

(51) Int. Cl.
*G01V 1/00* (2006.01)
(52) U.S. Cl. .................................. 181/108; 181/113
(58) Field of Classification Search ................. 181/108, 181/113; 367/157; 702/17
See application file for complete search history.

(56) References Cited

U.S. PATENT DOCUMENTS

| | | | |
|---|---|---|---|
| 3,583,677 A | 6/1971 | Phillips | |
| 4,193,647 A * | 3/1980 | Guess et al. | 310/324 |
| 4,287,582 A * | 9/1981 | Tocquet | 367/163 |
| 4,537,256 A | 8/1985 | Beard | 166/299 |
| 4,991,152 A * | 2/1991 | Letiche | 367/158 |
| 5,027,331 A * | 6/1991 | Winbow et al. | 367/75 |
| 5,036,945 A * | 8/1991 | Hoyle et al. | 181/104 |
| 5,212,354 A * | 5/1993 | Miller et al. | 181/108 |
| 5,313,025 A * | 5/1994 | Roessler et al. | 181/106 |
| 5,343,001 A * | 8/1994 | Cowles et al. | 181/102 |
| 5,406,531 A * | 4/1995 | Henriquez et al. | 367/157 |
| 5,477,101 A * | 12/1995 | Ounadjela | 310/334 |
| 5,595,243 A | 1/1997 | Maki et al. | 166/177.2 |
| 5,639,997 A * | 6/1997 | Mallett | 181/102 |
| 5,836,389 A | 11/1998 | Wagner et al. | 166/249 |
| 6,012,521 A | 1/2000 | Zunkel et al. | 166/249 |
| 6,035,257 A * | 3/2000 | Epperson | 702/17 |

(Continued)

FOREIGN PATENT DOCUMENTS

EP    0 005 409    4/1981

(Continued)

OTHER PUBLICATIONS

Adinathan Venkitaraman, et al. "Ultrasonic Removal of Near-Wellbore Damage Caused by Fines and Mud Solids," SPE 27388, at 441-449, 1994.

(Continued)

*Primary Examiner*—Jeffrey Donels
*Assistant Examiner*—Forrest M Phillips
(74) *Attorney, Agent, or Firm*—John W. Wustenberg; Baker Botts, LLP (57) ABSTRACT

An example apparatus for generating acoustic waves is disclosed. The example apparatus includes a housing, and at least one plate having a moment arm, wherein each plate couples to the housing. The example apparatus for generating acoustic also includes at least one axial driver coupled to each moment arm, wherein each axial driver aligns with a longitudinal axis of the housing.

22 Claims, 8 Drawing Sheets

U.S. PATENT DOCUMENTS

| | | | |
|---|---|---|---|
| 6,220,371 B1 | 4/2001 | Sharma et al. | 175/50 |
| 6,390,191 B1 | 5/2002 | Melson et al. | 166/177.1 |
| 6,412,354 B1* | 7/2002 | Birchak et al. | 73/861.356 |
| 6,619,394 B2 | 9/2003 | Soliman et al. | 166/249 |
| 6,671,224 B1* | 12/2003 | Pabon | 367/82 |
| 6,705,396 B1 | 3/2004 | Ivanikov et al. | 166/249 |
| 2002/0070017 A1* | 6/2002 | Soliman et al. | 166/249 |
| 2002/0136090 A1 | 9/2002 | Birchak et al. | 367/157 |
| 2007/0045038 A1* | 3/2007 | Han et al. | 181/113 |
| 2007/0064539 A1* | 3/2007 | Han et al. | 367/189 |

FOREIGN PATENT DOCUMENTS

| | | |
|---|---|---|
| GB | 2 128 327 | 9/1984 |
| GB | 2 137 024 | 9/1984 |

OTHER PUBLICATIONS

Peter M. Roberts, et al., "Ultrasonic Removal of Organic Deposits and Polymer Induced Formation Damage," SPE 31129, at 571-578, Feb. 14-15, 1996.

P.M. Roberts, et al., "Ultrasonic Removal of Organic Deposits and Polymer Induced Formation Damage," SPE 62046, at 19-24, Mar. 2000.

Brian Champion, et al., "The Application of High Power Sound Waves for Wellbore Cleaning," SPE 82197, at 1-10, 2003.

Sau-Wai Wong, et al., "Near Wellbore Stimulation by Acoustic Waves," SPE 82198, at 1-6, 2003.

Sau-Wai Wong, et al., "High Power/High Frequency Acoustic Stimulation—A Novel and Effective Wellbore Stimulation Technology," SPE 84118, at 1-7, 2003.

Fred van der Bas, et al., "Radial Near Wellbore Stimulation by Acoustic Waves," SPE 86492, at 1-7, 2004.

U.S. Appl. No. 10/953,237, filed Sep. 29, 2004, Birchak, et al.

U.S. Appl. No. 11/313,484, Han, et al.

F. van der Bas, et al., "Near-Wellbore Stimulation by Acoustic Waves," SPE 88767, 11th ADIPEC Conference, Abu Dhabi, UAE, Oct. 2004.

F. van der Bas, et al., "Acoustic Stimulation to Mitigate Near-Wellbore Damage," SPE 90356, 2004 SPE Annual Conference, Houston, Texas, Sep. 2004.

S.W. Wong, , et al., "High Power/High Frequency Acoustic Stimulation: A Novel and Effective Wellbore Stimulation Technology," SPE Production & Facilities vol. 19, No. 4, at 183-188, Nov. 2004.

F. van der Bas, et al., "Acoustic Stimulation to Mitigate Near-Wellbore Damage," Journal of Petroleum Technology, at 52-53, 70, Mar. 2005.

Foreign communication related to a counterpart application dated Nov. 21, 2006.

* cited by examiner

APPARATUSES FOR GENERATING ACOUSTIC WAVES

CROSS-REFERENCE TO RELATED APPLICATIONS

The present invention is related to co-pending U.S. application Ser. No. 11/213,484, entitled "Generating Acoustic Waves," filed concurrently herewith, the entire disclosure of which is incorporated herein by reference.

BACKGROUND

The present invention relates to apparatuses for generating acoustic waves. As used herein, the term "wave" shall include any disturbance that propagates from one point in a medium to other points without giving the medium as a whole any permanent displacement, including, but not limited to, disturbances having cyclic waveforms and disturbances having noncyclic waveforms. The term "wave" may also include pressure sequences. In any typical hydrocarbon well, damage to the surrounding formation can impede fluid flow and cause production levels to drop. While many damage mechanisms plague wells, one of the most pervasive problems is particles clogging the formation pores that usually allow hydrocarbon flow. These clogging particles can also obstruct fluid pathways in screens; preslotted, predrilled, or cemented and perforated liners; and gravel packs that may line a well. Clogging particles may even restrict fluid flow in open-hole wells. Drilling mud, drilled solid invasion, or even the porous formation medium itself may be sources for these particles. In particular, in situ fines mobilized during production can lodge themselves in the formation pores, preslotted liners, screens and gravel packs, sealing them to fluid flow. Referred to as the "skin effect," this damage is often unavoidable and can arise at any stage in the life of a typical hydrocarbon well. The hydrocarbon production industry has thus developed well-stimulation techniques to repair affected wells or at least mitigate skin-effect damage.

The two classic stimulation techniques for formation damage, matrix acidizing and hydraulic fracturing, suffer from limitations that often make them impractical. Both techniques require the operator to pump customized fluids into the well, a process that is expensive, invasive and difficult to control. In matrix acidizing, pumps inject thousands of gallons of acid into the well to dissolve away precipitates, fines, or scale on the inside of tubulars, in the pores of a screen or gravel pack, or inside the formation. Any tool, screen, liner or casing that comes into contact with the acid must be protected from its corrosive effects. A corrosion inhibitor must be used to prevent tubulars from corrosion. Also, the acid must be removed from the well. Often, the well must also be flushed with pre- and post-acid solutions. Aside from the difficulties of determining the proper chemical composition for these fluids and pumping them down the well, the environmental costs of matrix acidizing can render the process undesirable. Screens, preslotted liners and gravel packs may also be flushed with a brine solution to remove solid particles. While this brine treatment is cheap and relatively easy to complete, it offers only a temporary and localized respite from the skin effect. Moreover, frequent flushing can damage the formation and further decrease production. In hydraulic fracturing, a customized fluid is ejected at extremely high pressure against the well bore walls to force the surrounding formation to fracture. The customized gel-based fluid contains a proppant to hold the fractures open to fluid flow. While this procedure is highly effective at overcoming near-borehole skin effects, it requires both specialized equipment and specialized fluids and therefore can be costly. Fracturing can also result in particle deposition in the formation because the gels involved may leave residue in the vicinity of the fractures.

The hydrocarbon production industry developed acoustic stimulation as an alternative to the classic stimulation techniques. In acoustic stimulation used for near-borehole cleaning, high-intensity, high-frequency acoustic waves transfer vibrational energy to the solid particles clogging formation pores. The ensuing vibrations of the solid particles loosen them from the pores. Fluid flow, including production-fluid flow out of the formation or injection-fluid flow into the formation from the well, may cause the particles to migrate out of the pores into the near-wellbore area where the greatest pressure drops exists, clearing the way for greater fluid flow. Acoustic stimulation may also be used to clean preslotted liners, screens and gravel packs. Near-well bore cleaning by acoustic stimulation has shown great promise in laboratory experiments, and the industry has developed several tools using this technique for use in real-world wells.

Acoustic stimulation tools require a compact source of acoustic waves that may be used downhole. Many current tools radiate acoustic waves over 360 degrees or in an uncontrolled direction in an attempt to reduce the skin effect along the circumference of a well bore at a given depth all at one time. These tools consume large quantities of energy to radiate waves of sufficient intensity to vibrate the solid particles along the circumference of the well bore. Supplying this energy downhole to create the necessary high-intensity acoustic waves is no easy feat, and thus these tools are poorly suited for removing solid particles from the formation. Because these tools often stretch across nearly the entire diameter of the well bore, they also cannot move through narrow passages such as production tubing or even small-diameter well bores.

SUMMARY

The present invention relates to apparatuses for generating acoustic waves. An example apparatus for generating acoustic waves comprises a housing, and at least one plate having a moment arm, wherein each plate couples to the housing. The example apparatus for generating acoustic also comprises at least one axial driver coupled to each moment arm, wherein each axial driver aligns with a longitudinal axis of the housing.

An alternate example apparatus for generating acoustic waves comprises a housing, a plate having a moment arm, wherein the plate couples to the housing, and a pair of axial drivers coupled to the moment arm, wherein the pair of axial drivers aligns with a longitudinal axis of the housing.

Another example apparatus for generating acoustic waves comprises a housing and a plate having a moment arm, wherein the plate couples to the housing. The example apparatus also comprises two tapered force shafts coupled to the moment arm, wherein each tapered force shaft has a narrow end and a wide end, and wherein each tapered force shaft couples to the moment arm at the narrow end. An axial driver couples to the wide end of each tapered force shaft, wherein each axial driver aligns with a longitudinal axis of the housing. A backing mass couples to each axial driver, wherein the backing mass is formed of a material selected to compensate for thermal expansion of the housing. The example apparatus also comprises a preload bolt coupling each backing mass to the housing such that the moment arm experiences a substantially net zero preload force.

The features and advantages of the present invention will be readily apparent to those skilled in the art upon a reading of the description of the embodiments that follows.

DRAWINGS

The following figures form part of the present specification and are included to further demonstrate certain aspects of the present invention. The invention may be better understood by reference to one or more of these drawings in combination with the description of embodiments presented herein.

DESCRIPTION

The present invention relates to apparatuses for generating acoustic waves. To facilitate a better understanding of the present invention, the following examples of specific embodiments are given. In no way should the following examples be read to limit or define the entire scope of the invention.

Figure 1:
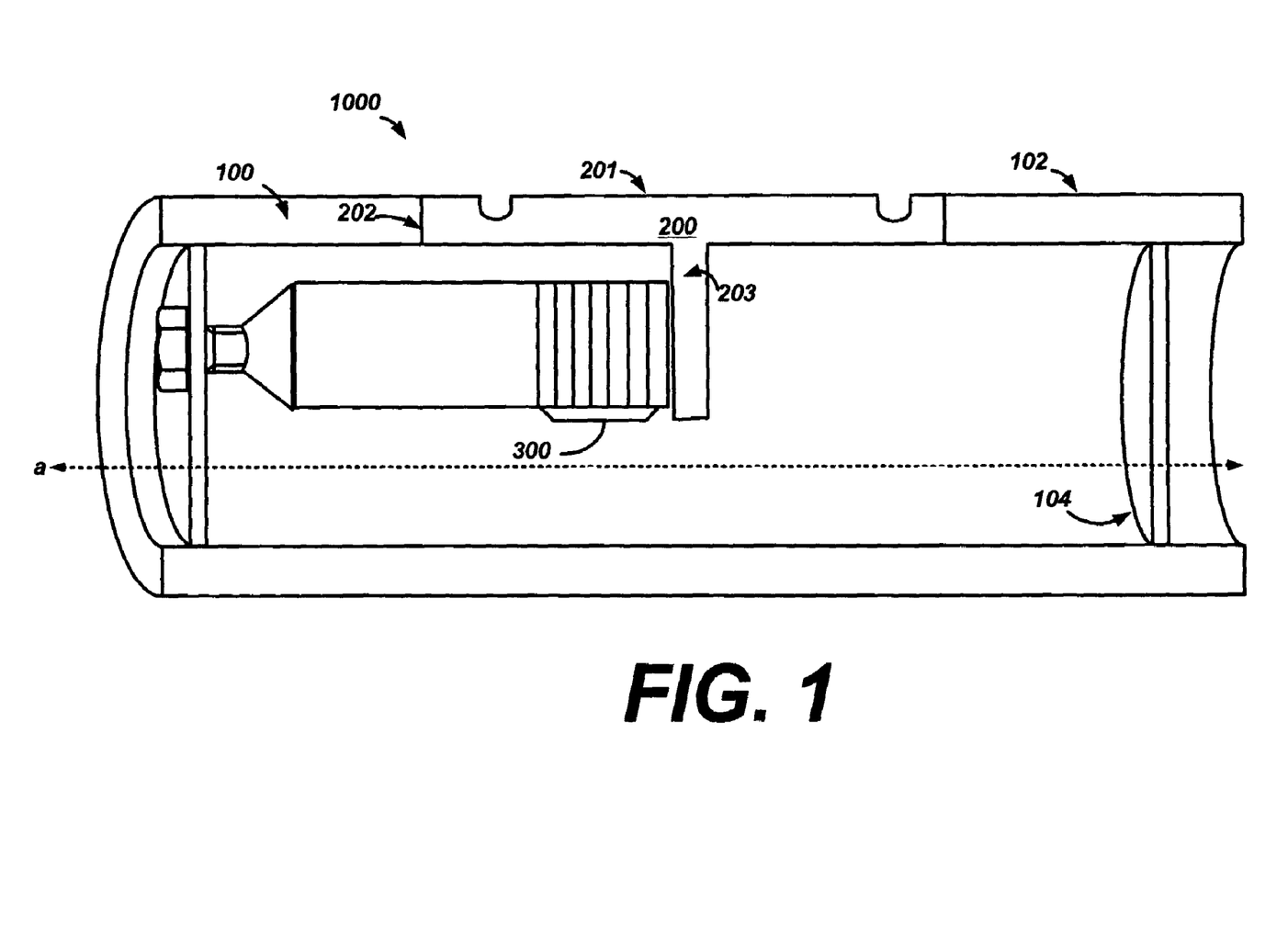
FIG. 1 illustrates an example wave-generation tool, with a portion of the wave-generation tool's housing removed to expose the wave-generation tool's contents.

FIG. 1 illustrates a perspective view of an exemplary wave-generation tool 1000 comprising a housing 100. In FIG. 1, a section of housing 100 has been removed to expose the contents of wave-generation tool 1000. While FIG. 1 shows it as a tubular enclosure, housing 100 may take other forms, as desired. For example, housing 100 may be a rectangular enclosure. Should wave-generation tool 1000 be part of an acoustic-cleaning system for use in downhole environments, the inner diameter of the well or its lining, casing, or screen will constrain the outer diameter of housing 100. Housing 100 may be made of a fatigue-resistant material, such as, for example, a suitable titanium alloy. An example wave-generation tool also comprises at least one plate coupled to the housing. Wave-generation tool 1000 shown in FIG. 1 comprises a plate 200 coupled to housing 100; although this figure and the others in this application include only a single plate 200, an example wave generation tool may include any number of plates 200 coupled to housing 100, as a person of ordinary skill in the art having the benefit of this disclosure will realize. For example, a wave-generation tool may comprise several plates coupled to the housing at intervals along the outer surface of the housing. As used herein, the term "couple" or "couples" is intended to mean either an indirect or direct connection. Thus, if a first device "couples" to a second device, that connection may be through a direct connection or through an indirect connection via other devices or connectors.

Plate 200 may fit inside a recess in housing 100 such that an outer surface 201 of plate 200 is flush with an outer surface 102 of housing 100. In some examples of wave-generation tools 1000, plate 200 may have a thick perimeter surface 202 that can be welded to the surface of the recess in housing 100. Perimeter surface 202 must be sufficiently thick to avoid distortion of the plate during the welding process. Example plates 200 also include a member 203 that projects into the interior of housing 100. As discussed later in this application, member 203 acts as a moment arm. Thus in some example wave-generation tools 1000, plate 200 may be cast as a single piece to ensure that member 203 does not break away from the rest of plate 200.

At least one axial driver couples to the moment arm of an example wave-generation tool. The example wave-generation tool 1000 shown in FIG. 1 includes a single axial driver 300. Axial driver 300 aligns with a longitudinal axis "a" of housing 100. Axial driver 300 can provide force to plate 200 in directions parallel to axis a. If the housing has a greater length than width, as in housing 100, a longitudinal mount will help stabilize the axial driver or drivers and provide some protection from damage that might occur if the housing was bumped or struck and the driver or drivers aligned along a diameter or width of the housing. This longitudinal configuration may also maximize the volume available for axial driver 300 while minimizing the outer diameter of housing 100. Other configurations for axial driver 300, however, may be desired in certain example wave-generation tools 1000. Axial driver 300 may be any device capable of supplying the mechanical force necessary to move member 203. For example, axial driver 300 may be one or more piezoelectric elements, such as a stack of parallel-wired piezoelectric film discs, or one or more magnetostrictive elements. If axial driver 300 includes a piezoelectric stack, the stack length may be selected to generate strong forces at the fastest switching rate desired; the lower the maximum switching rate, the greater the length of the stack. Axial driver 300 may be activated by a signal supplied from outside or inside of housing 100, as desired.

Figure 2:
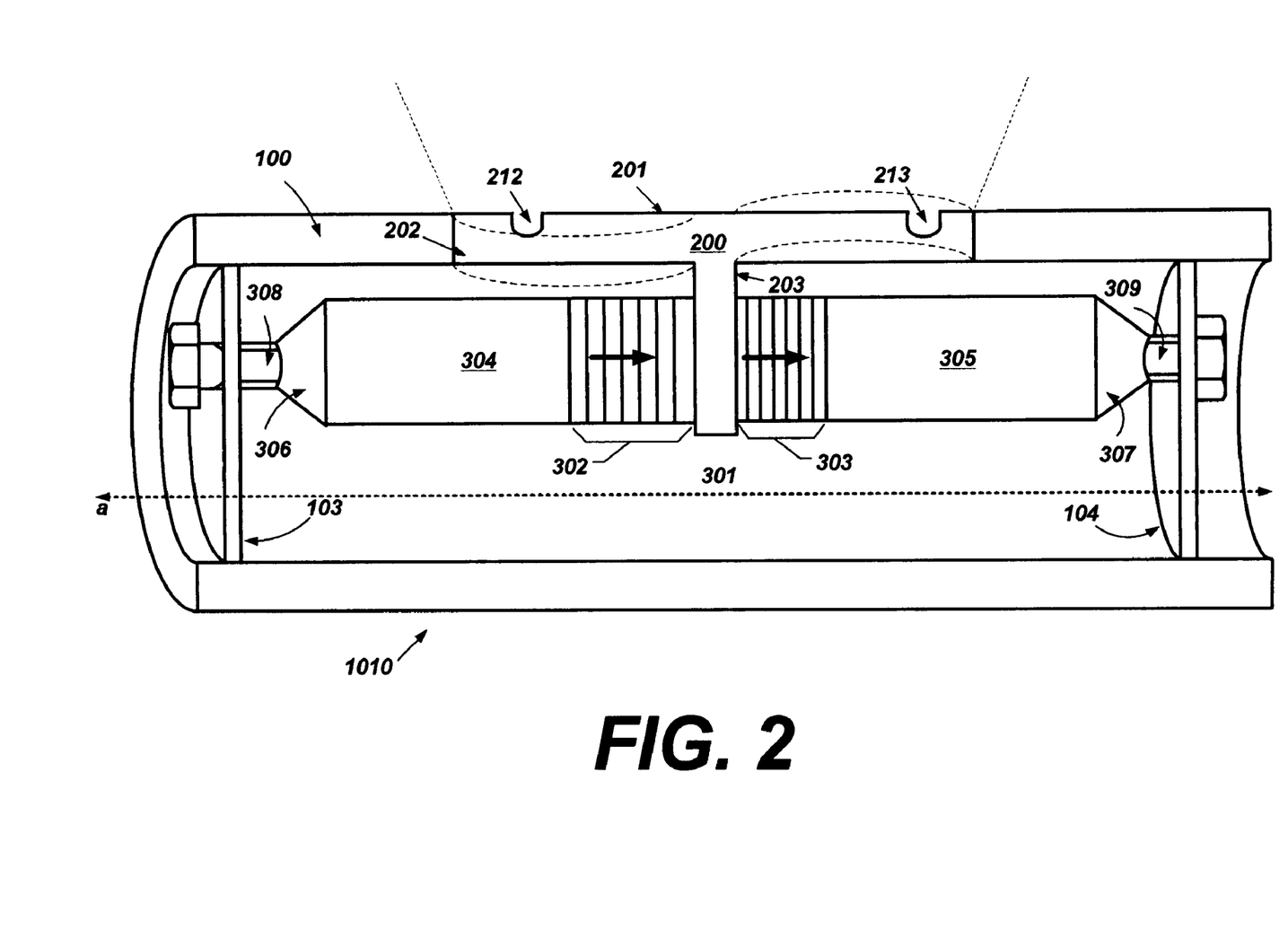
FIG. 2 illustrates an example wave-generation tool, with a portion of the wave-generation tool's housing removed to expose the wave-generation tool's contents.

In the example wave-generation tool 1010 illustrated in FIG. 2, a pair of axial drivers, denoted generally by the numeral 301, couples to plate 200 at member 203. Pair of axial drivers 301 may also align with axis "a" of housing 100, as with axial driver 300. Pair of axial drivers 301 is comprised of axial drivers 302 and 303. Axial drivers 302 and 303 may also couple to backing masses 304 and 305, respectively. Backing masses 304 and 305 act as inertial stops to axial drivers 302 and 303, allowing the axial drivers to maximize the transfer of force to plate 200. Backing masses 304 and 305 in turn may couple to springs 306 and 307, respectively. In the example embodiment shown in FIG. 2, springs 306 and 307 are Bellville washers chosen to have a deflection that absorbs vibrations passed from axial drivers 302 and 303 through backing masses 304 and 305, while permitting adequate take-up for wear. Preload bolts 308 and 309 may then couple backing masses 304 and 305 through springs 306 and 307 to support walls 103 and 104 of housing 100. Preload bolts 308 and 309 may thus dissipate force from backing masses 304 and 305 over housing 100. An example wave-generation tool including only a single axial driver may comprise a similarly-configured backing mass, spring, and preload bolt for the single axial driver.

In the example wave-generation tool 1010 shown in FIG. 2, preload bolt 308 may load backing mass 304 and axial driver 302 up to a loading pressure that balances the loading pressure exerted on backing mass 305 and axial driver 303 by preload bolt 309. As a result, plate 200 would experience a net loading force of approximately zero at member 203. This configuration may help prevent fatigue of plate 200 and thus prolong the life of wave-generation tool 1010. In certain example wave-generation tools, housing 100 and backing masses 304 and 305 have thermal expansion coefficients chosen to compensate for any combined thermal expansion of these parts plus preload bolts 308 and 309, springs 306 and 307, and drivers 302 and 303. The choice of temperature-compensating backing masses and housing allows example wave-generation tools to operate over wide ranges of temperatures.

The example wave-generation tools generate acoustic waves in a variety of timing patterns through the vibration of plate 200. Axial drivers 302 and 303 apply force to plate 200 at member 203 in directions parallel to axis a. In the example wave-generation tool 1010 shown in FIG. 2, axial drivers 302 and 303 are stacks of piezoelectric discs that expand and contract when subjected to electrical voltages, pushing and pulling against member 203 of plate 200. In FIG. 2, for example, axial driver 302 is expanding, while axial driver 303 is contracting. The expansion and contraction of pair of axial drivers 301 with an 180-degree phase shift generates a force on plate 200, in the direction of the arrows over axial drivers 302 and 303. In response to this force, plate 200 buckles inwardly nearest axial driver 302 and outwardly nearest axial driver 303. The dashed lines in FIG. 2 over plate 200 illustrate an exaggerated buckling effect; ordinarily, the bulges in plate 200 will be much less pronounced. If axial driver 302 now contracts while axial driver 303 expands, they will exert a reversed force on plate 200. Plate 200 will then buckle outwardly near axial driver 302 and inwardly near axial driver 303, in a mirror image to the buckling shown in FIG. 2. Cycling through the forward and reversed driving forces will cause repeated buckling of plate 200. The buckling motion, or vibration, of plate 200 in turn generates acoustic waves that radiate outward from plate 200. The force-switching pattern for axial drivers 302 and 303 will control the timing patterns for the generated waves. That is, the drivers can be switched rapidly from expanding to contracting, and vise versa, to select the desired time-rate-of-change for the acoustic wave response. This approach may best be used for noncyclic waves, including noncyclic pressure sequences. The drivers can, for example, be driven in the high-frequency switching mode or in an acoustic frequency mode. Wave-generation tool 1010 radiates acoustic waves from a single confined region, that of plate 200, rather than from its entire surface, for example. As a person of ordinary skill in the art will realize, the same buckling effect and resulting acoustic wave generation can be created using a single axial driver acting on the moment arm.

Plate 200 may vibrate at its fundamental mode resonance, as well as at higher-mode resonances. Plate 200 may also vibrate at non-resonance frequencies, but most likely at reduced amplitudes. In the example wave-generation tool 1010 shown in FIG. 2, maintaining an equal voltage input and a 180-degree phase shift between activation of axial driver 302 and axial driver 303 helps maximize the amplitude through which plate 200 moves. Pair of axial drivers 301 may be cyclically activated, such as with a sine wave signal, or noncyclically activated in pulses. Plate 200 may be formed of a material selected to obtain optimum acoustic intensity versus radial distance from the surface for the generated acoustic waves; the geometric configuration of plate 200 may also be selected to enhance the acoustic intensity of the generated acoustic waves. For example, outer surface 201 of plate 200 may have curved portions, flat portions, or any combination of curved and flat portions to maximize acoustic intensity.

Moreover, in some example wave-generation tools, the geometric dimensions of the plate may be chosen to obtain resonance at desired frequencies or in a desired frequency range. For example, if wave-generation tool 1010 will be used in an acoustic-cleaning system for use in downhole environments, frequencies in the range of approximately 10 kHz to approximately 40 kHz may be desirable. FIGS. 3, 4, 5, 6, 7, 8, and 9 illustrate a few of the many possible geometric configurations for plate 200. These example plates should not be construed as defining the full scope of possible plate designs.

Figures 3, 5:
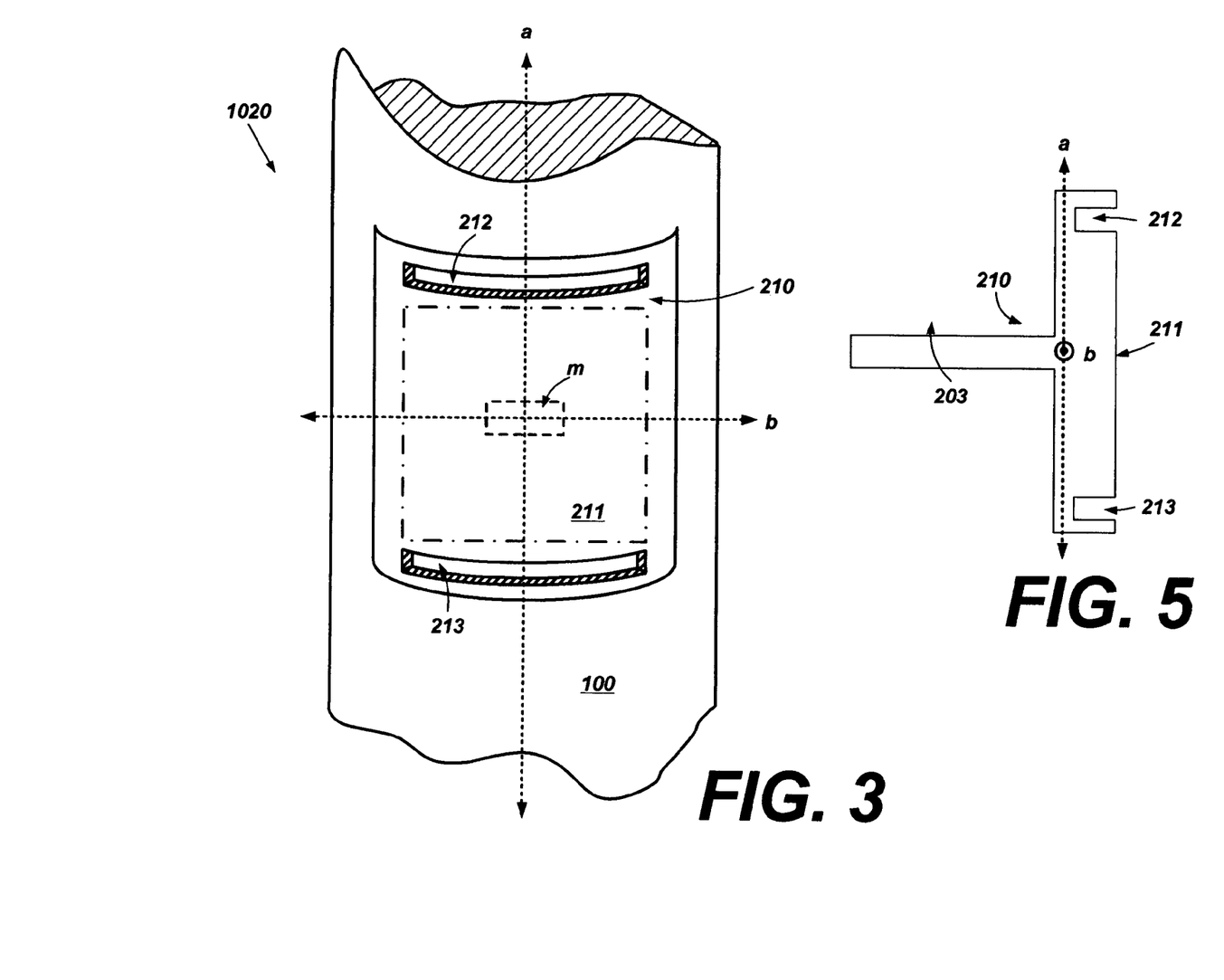
FIG. 3 illustrates an example plate in an example wave-generation tool.
FIG. 5 illustrates a cross-sectional view of an example plate that may be used in a wave-generation tool.
Figure 4:
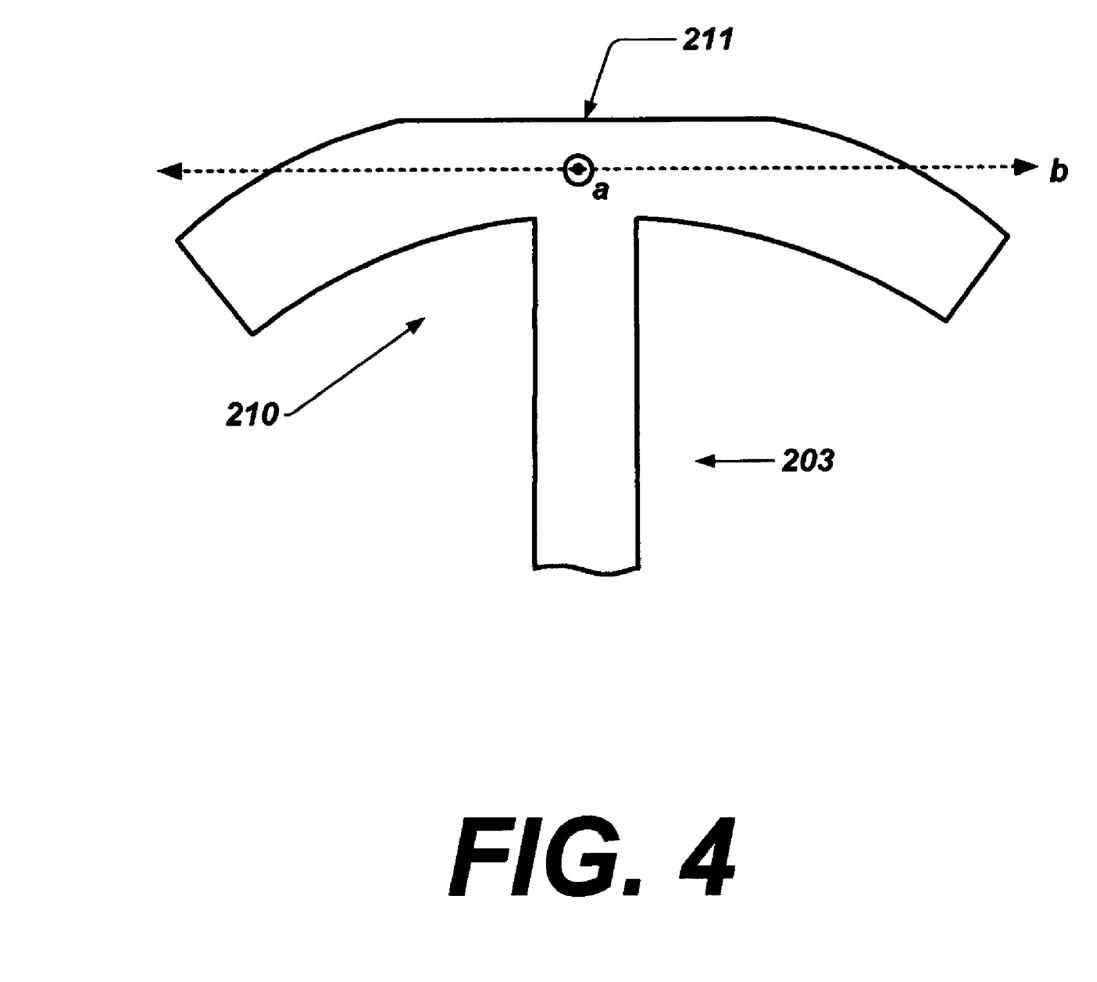
FIG. 4 illustrates a cross-sectional view of an example plate that may be used in a wave-generation tool.

FIG. 3 illustrates an example plate 210 of an example wave-generation tool 1020 with longitudinal axis a, and a transverse axis "b" that is perpendicular to axis a. FIG. 4 shows a cross-sectional view of the same plate 210, taken along axis b, and FIG. 5 shows another cross-sectional view of plate 210 taken along axis a. As illustrated in FIGS. 3, 4, and 5, plate 210 may be rectangular, with the length of the rectangle aligned with longitudinal axis a of housing 100. Rectangular area 211, enclosed by the dash-dot line, indicates a flat portion of plate 210. Rectangular area "m," enclosed by the dashed line, indicates the location of member 203 behind outer surface 201. In this example, plate 210 has two channels 212 and 213 that extend below in outer surface 201. Plate 210 is accordingly thinner in channels 212 and 213 than, for example, in rectangular area 211. Channels 212 and 213 decrease the stiffness of plate 210 at its top and bottom ends, as shown in FIG. 3. This configuration weakens the coupling between plate 210 and housing 100 and lowers the resonance frequency of plate 210. This semi-decoupling may also lead to more efficient concentration of acoustic power and to reduced generation of acoustic waves in unwanted modes, such as waves in transverse-axial or torsional modes, because the vibrations are effectively confined to the area between channels 212 and 213.

Figure 6:
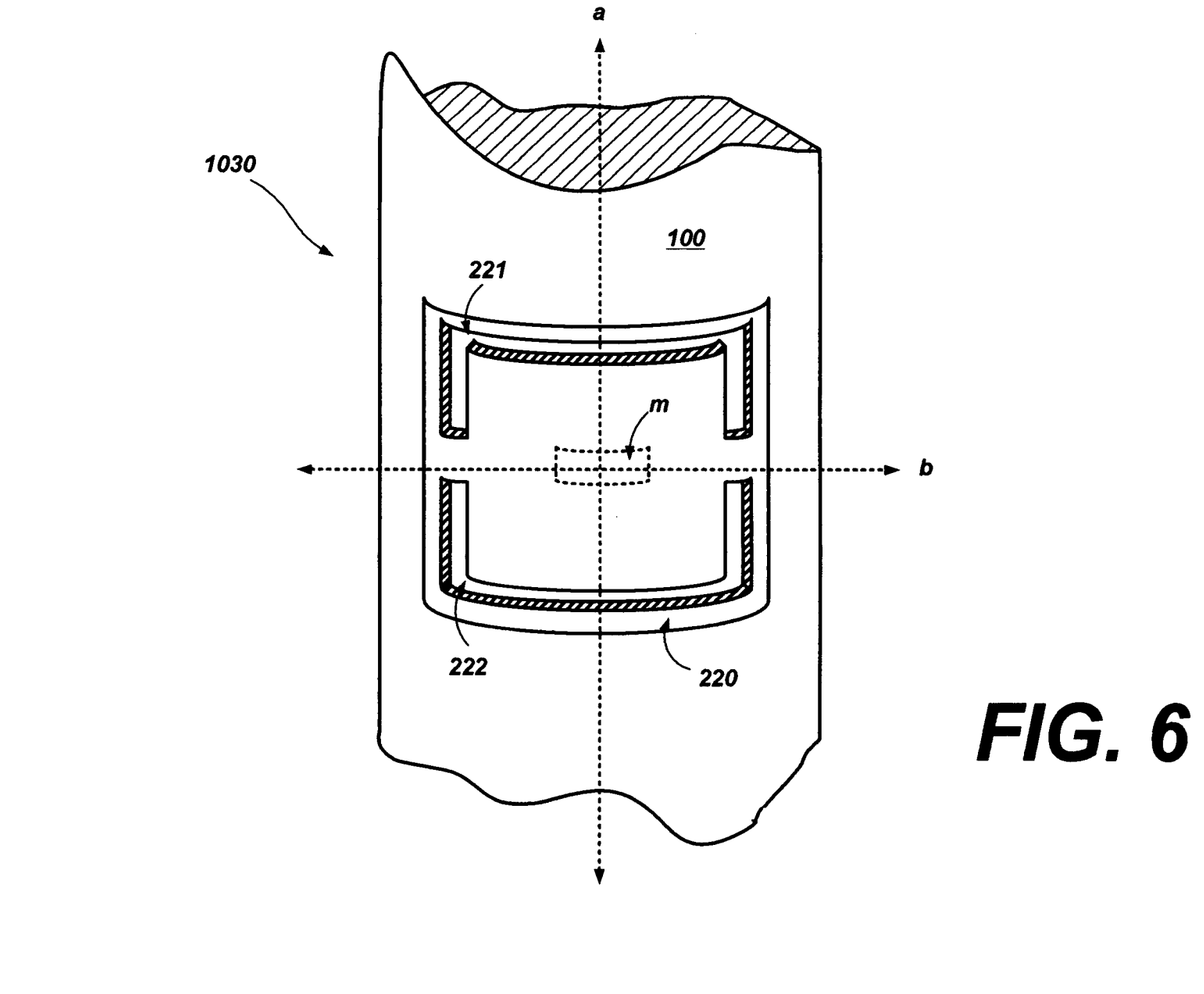
FIG. 6 illustrates an example plate in an example wave-generation tool.
Figure 7:
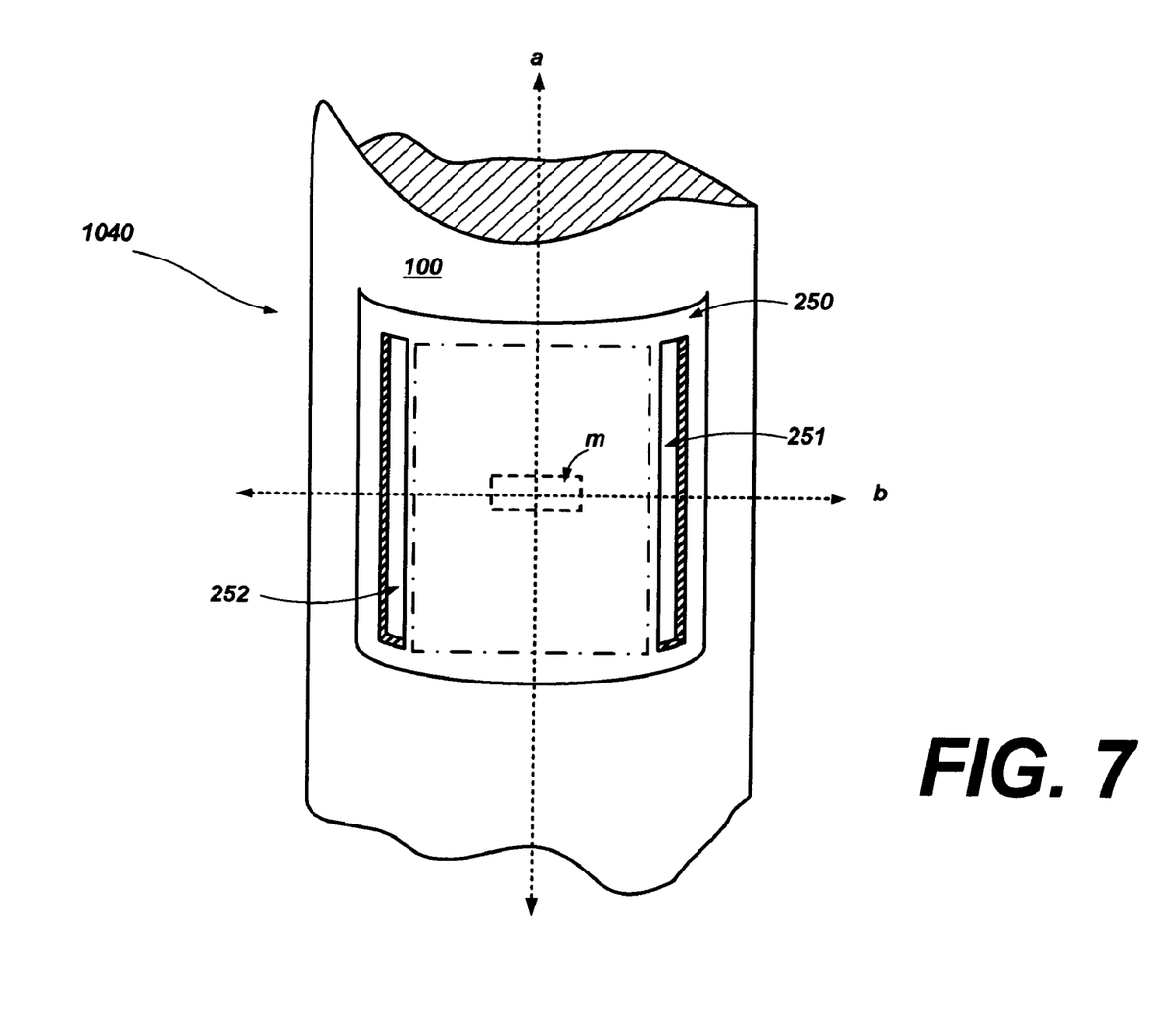
FIG. 7 illustrates an example plate in an example wave-generation tool.

Although example plate 210 in FIGS. 3, 4, and 5 has two channels across its width, any number or configuration of channels may be used—including no channels at all. The presence or absence of channels, and their configuration, influences the resonance frequency or frequencies of plate 210. FIG. 6 illustrates an example wave-generation tool 1030 with a plate 220 that has two U-shaped channels 221 and 222. This configuration yields an even lower stiffness for plate 220 than channels 212 and 213 in plate 210. Consequently, the resonance frequency or frequencies of plate 220 will generally be lower than those of plate 210, if all the other dimensions remain constant. The area of plate 220 surrounded by channels 221 and 222, enclosed by the dash-dot line, will become the dominant vibrating surface area. This area may be flat, curved, or some combination of flat and curved to maximize vibrations as desired. FIG. 7 illustrates an example wave-generation tool 1040 with a plate 250. Two channels 251 and 252 are cut into transverse sides of plate 250, decreasing stiffness along those sides. Again, the area between channels 251 and 252 enclosed by the dash-dot line will become the dominant vibrating surface area and may be flat, curved, or some combination of flat and curved to maximize vibration.

Figures 8, 9:
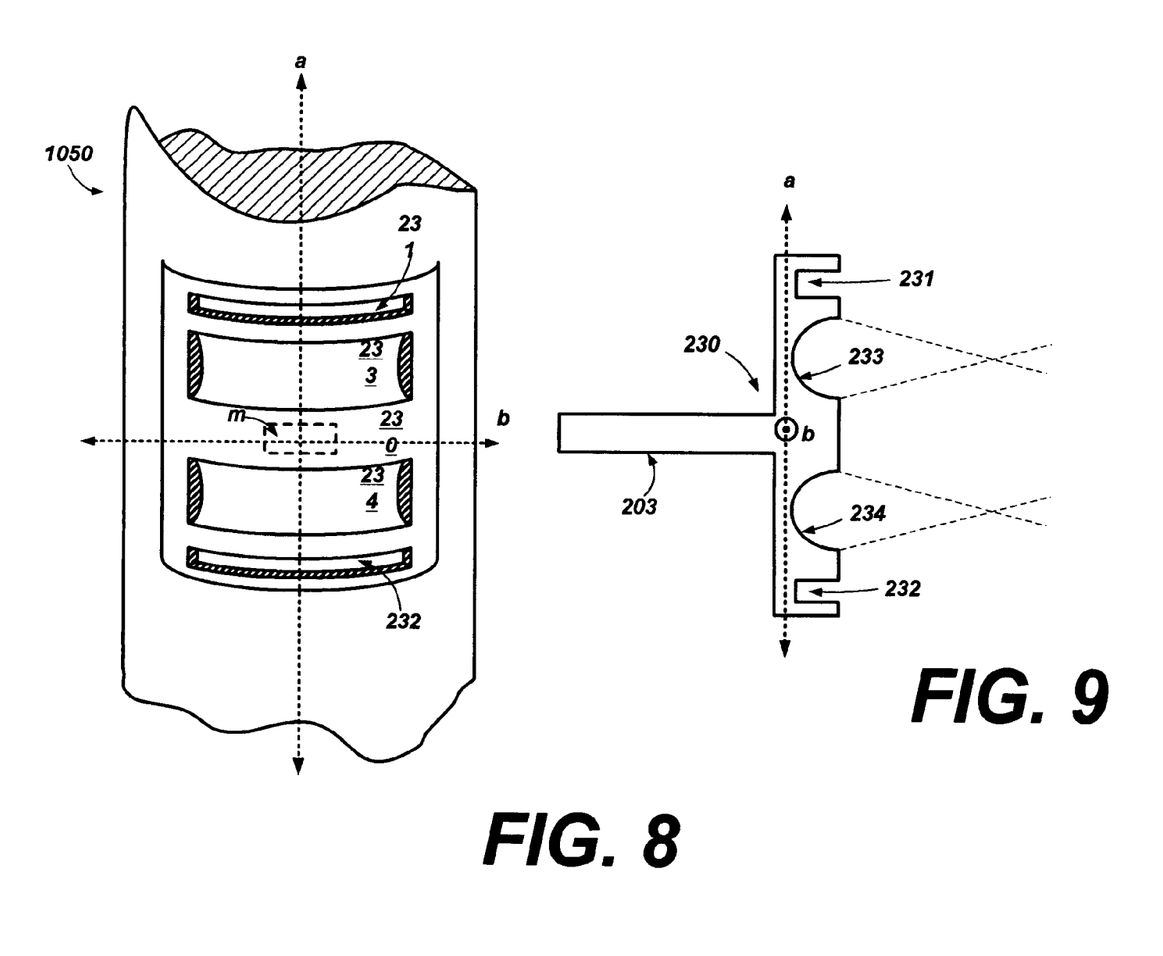
FIG. 8 illustrates a cross-sectional view of an example plate that may be used in a wave-generation tool.
FIG. 9 illustrates an example plate in an example wave-generation tool.

FIG. 8 illustrates another plate 230 of an example wave-generation tool 1050; FIG. 9 shows a cross-sectional view of plate 230, taken along axis a. Similar to plate 210, plate 230 has two channels 231 and 232 at its top and bottom, as plate 210 is shown in FIG. 8. The area m enclosed by the dashed line again indicates the location of the member behind the outer surface of plate 230. Plate 230 may have one or more concave areas, such as concave areas 233 and 234. Although FIGS. 8 and 9 show plate 230 with two concave areas, plate 230 may have as many concave areas as desired. Concave areas 233 and 234 may be used to create concentrated acoustic wave beams, as indicated by the dotted lines in FIG. 9. The acoustic beam diameter will depend on the curvature of concave areas 233 and 234, the length of concave areas 233 and 234, and the wavelength of the generated waves in whatever fluids may be present near plate 230, such as air or formation liquids. The curvature of concave areas 233 and 234 may be selected to create a beam at a desired focal length and of a desired focal spot size. Moreover, for a given plate configuration, by varying the driver frequency, acoustic beams of variable focal spot size can be generated. The focused acoustic wave beams created by concave areas 233 and 234 may be useful for certain uses for wave-generation tools, such as acoustic-cleaning systems in downhole environments. For example, wave-generation tools may create concentrated acoustic beams on the areas of the borehole to be treated if the curvature approximant is close to the desired depth of cleaning in the borehole.

Figure 10:
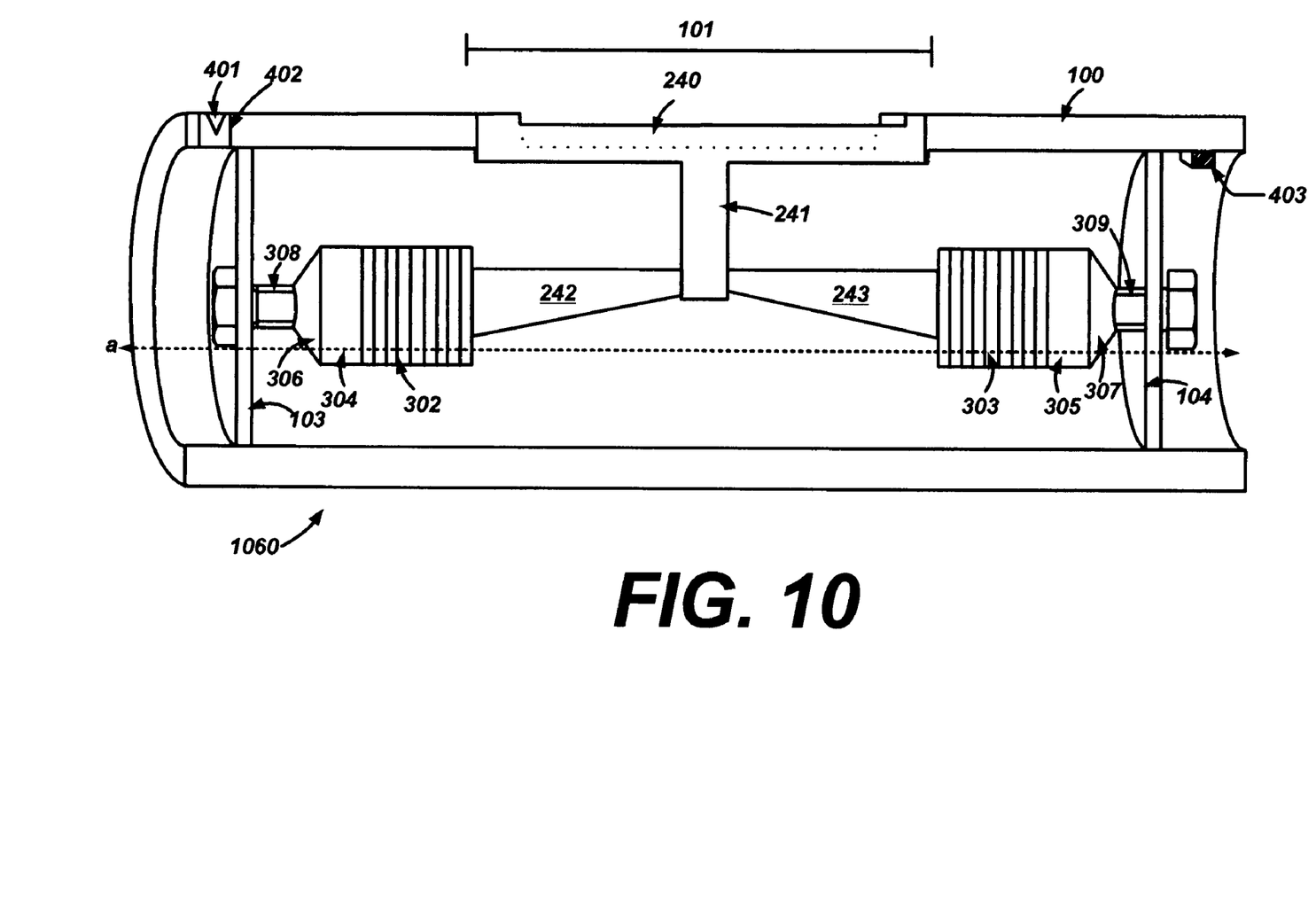
FIG. 10 illustrates an example wave-generation tool, with a portion of the wave-generation tool's housing removed to expose the wave-generation tool's contents.

FIG. 10 illustrates another example of a wave-generation tool 1060 comprising a plate 240. The central region of example plate 240 has been thinned to increase flexibility; plate 240 may also have one or more channels, as indicated by the dotted line over plate 240, to further decrease stiffness along the transverse sides of plate 240. The ends of example plate 240, however, are thicker than the central region. This configuration maintains relatively high stiffness at those ends, which may be useful for generating high-frequency acoustic waves. Axial drivers 302 and 303 may couple indirectly to the plate through at least one coupler. The coupler may assume a variety of forms. For example, axial drivers 302 and 303 may couple to member 241 of plate 240 via tapered force shafts 242 and 243, respectively. Tapered force shafts 242 and 243 each have a narrow end and a wide end, as shown in FIG. 10. Tapered force shafts 242 and 243 couple to member 241 near their narrow ends and couple to axial drivers 302 and 303 near their wide ends. Tapered force shafts 242 and 243 may thus be used to focus the force generated by axial drivers 302 and 303 over a small area on member 241, much like the acoustic horn of a cell disrupter. The relatively large deflections of the narrow tips of tapered force shafts 242 and 243 can therefore increase the acoustic intensity of the generated acoustic waves. Thus example wave-generation tools can produce high-intensity acoustic waves without exceeding the strain rating of the axial drivers, which is of particular concern for piezoelectric drivers. In other example wave-generation tools, coupler may assume other forms, such as rectangular or conical.

Example wave-generation tools may also include a feedback mechanism that enables the user to monitor the vibrations the plate experiences and even monitor the acoustic intensity of the generated waves. For example, as FIG. 10 illustrates, wave-generation tool 1060 may comprise a hydrophone 401 coupled to, but also acoustically isolated from by an insulator 402, housing 100. If wave-generation tool 1060 is submerged in a liquid, hydrophone 401 may then monitor acoustic waves generated by wave-generation tool 1060 by monitoring those waves as they travel in liquid proximate to housing 100. Wave-generation tool 1060 may also, or instead, include an accelerometer 403 coupled to housing 100, also shown in FIG. 10. Accelerometer 403 may measure vibrations in housing 100. Using information gathered by the feedback mechanism, a user of wave-generation tool 1060 may alter the frequency at which axial drivers 302 and 303 operates to enhance desired modes or reduce the presence of waves in unwanted modes, such as transverse-axial or torsional modes. For example, the user may activate axial drivers 302 and 303 to sweep through a range of frequencies. Axial drivers 302 and 303 will apply force to plate 240, causing plate 240 to vibrate in a frequency sweep as well. Plate 240 will generate acoustic waves that vary with the change in activation frequencies of axial drivers 302 and 303. The feedback mechanism, such as hydrophone 401 or accelerometer 403, may detect the variances in the generated waves or in the actual vibrations plate 240 experiences.

From examining the feedback mechanism's output, the user may be able to discern the different modes of the generated acoustic waves for each frequency in the frequency sweep. As a person of ordinary skill in the art will appreciate, the output from a hydrophone 401, for example, will indicate the relative intensity of acoustic waves generated by wave-generation tool 1060. If wave-generation tool 1060 is tested empirically over a frequency sweep in an environment suitable for hydrophone use, hydrophone 401's output will indicate the frequencies of activation for wave-generation tool 1060 that yield the maximum acoustic intensity for generated acoustic waves. The user may thus select from the frequency sweep one or more frequencies that optimize acoustic intensity for the generated acoustic waves, and then activate axial drivers 302 and 303 at those frequencies. Also, if wave-generation tool 1060 is used as a component of an acoustic-cleaning system for downhole environments, the user may determine which frequencies clean better empirically by measuring the production-flow rate at a certain region of a wall of a well bore, activating wave-generation tool 1060 at a given frequency proximate that certain region, and then comparing the production-flow rate after activation with previously-measured production-flow rate. Through a series of trials over a range of frequencies, the best cleaning frequency may be determined. Moreover, the user may select several frequencies from the frequency sweep that optimize acoustic intensities at frequencies best suited for cleaning different downhole structures, such as well bore walls, preslotted or predrilled liners, screens, and gravel packs. The frequencies best suited for cleaning will depend factors including, but not limited to, the mass and size of the particles in the borehole, the borehole dimensions, and the presence of any additional structures, such as screens and liners, in the borehole. An example acoustic-cleaning system for reducing skin effects in downhole environments is provided in an application entitled "Method and Apparatus for Reducing a Skin Effect in a Downhole Environment," Ser. No. 10/953,237, assigned to the assignee of this disclosure.

The present invention is therefore well adapted to carry out the objects and attain the ends and advantages mentioned, as well as those that are inherent therein. While the invention has been depicted and described, and is defined by reference to the exemplary embodiments of the invention, such a reference does not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only and are not exhaustive of the invention. Consequently, the invention is intended to be limited only by the spirit and scope of the appended claims, giving full cognizance to equivalents in all respects.

What is claimed is:

1. An apparatus for generating acoustic waves, comprising:
a housing, at least one plate having a moment arm, wherein each plate couples to the housing, and at least one axial driver coupled to each moment arm, wherein each axial driver aligns with a longitudinal axis of the housing, wherein the plate is operable to generate acoustic waves, and wherein an outer surface of the plate is flush with an outer surface of the housing.

2. The apparatus of claim 1, wherein each plate comprises at least one of the following: a flat portion; a convex portion; or a concave portion.

3. The apparatus of claim 1, further comprising a backing mass coupled to the at least one axial driver, wherein each backing mass is formed of a material selected to compensate for thermal expansion of the housing.

4. The apparatus of claim 1, wherein each plate has a geometric configuration selected to allow the plate to generate acoustic wave beams of varying focal spot size when a signal frequency used to drive the at least one axial driver varies.

5. The apparatus of claim 1, wherein each plate has a geometric configuration and is formed of a material selected to allow the plate to resonate at desired frequencies.

6. The apparatus of claim 1, wherein each plate comprises at least one channel to optimize stiffness of the plate.

7. The apparatus of claim 6, wherein each channel is designed to reduce acoustic waves generated in unwanted modes.

8. The apparatus of claim 1, wherein the at least one plate couples to the at least one axial driver through at least one coupler.

9. The apparatus of claim 8, wherein each coupler is a tapered force shaft having a narrow end at a junction between the tapered force shaft and the at least one plate and a wide end at a junction between the tapered force shaft and the at least one axial driver.

10. The apparatus of claim 1, wherein each axial driver comprises at least one of the following: a piezoelectric element; or a magnetostrictive device.

11. The apparatus of claim 1, further including at least one feedback device coupled to the housing.

12. The apparatus of claim 1, wherein the housing is formed of a fatigue-resistant material.

13. The apparatus of claim 12, wherein the housing is formed of a titanium alloy.

14. An apparatus for generating acoustic waves, comprising:

a housing, a plate having a moment arm, wherein the plate couples to the housing, and a pair of axial drivers coupled to the moment arm, wherein the pair of axial drivers aligns with a longitudinal axis of the housing, wherein the plate is operable to generate acoustic waves, and wherein an outer surface of the plate is flush with an outer surface of the housing.

15. The apparatus of claim 14, wherein the plate comprises at least one of the following: a flat portion; a convex portion; or a concave portion.

16. The apparatus of claim 14, wherein the plate has a geometric configuration and is formed of a material selected to allow resonance at desired frequencies.

17. The apparatus of claim 14, wherein the plate comprises one or more channels to optimize stiffness of the plate.

18. The apparatus of claim 14, wherein the one or more channels are designed to reduce acoustic waves generated in unwanted modes.

19. The apparatus of claim 14, wherein the plate couples to each axial driver through at least one tapered force shaft having a narrow end at a junction between the tapered force shaft and the moment arm and a wide end at a junction between the tapered force shaft and the axial driver.

20. The apparatus of claim 14, wherein each axial driver couples to a backing mass, and wherein the backing mass is preloaded with a bolt such that the moment arm experiences a substantially net zero preload force.

21. The apparatus of claim 14, wherein each axial driver couples to a backing mass, and wherein the backing mass is formed of a material selected to compensate for thermal expansion of the housing.

22. An apparatus for generating acoustic waves, comprising:

a housing, a plate having a moment arm, wherein the plate couples to the housing, two tapered force shafts coupled to the moment arm, wherein each tapered force shaft has a narrow end and a wide end, and wherein each tapered force shaft couples to the moment arm at the narrow end, an axial driver coupled to the wide end of each tapered force shaft, wherein each axial driver aligns with a longitudinal axis of the housing, a backing mass coupled to each axial driver, wherein the backing mass is formed of a material selected to compensate for thermal expansion of the housing, and a preload bolt coupling each backing mass to the housing such that the moment arm experiences a substantially net zero preload force, wherein the plate is operable to generate acoustic waves, and wherein an outer surface of the plate is flush with an outer surface of the housing.

* * * * *